United States Patent
Streltsov

[11] 3,728,799
[45] Apr. 24, 1973

[54] APPARATUS FOR PRODUCING THERMOPLASTIC SHEET ARTICLES

[75] Inventor: Konstantin Nilolaevich Streltsov, Leingrad, U.S.S.R.

[73] Assignee: Osboe opytno-konstruktorskoe bjuro po razvitiju mekhano-pnevmaticheskoi tekhnologii, Leingrad, Strelna Krasnoselskoe shossee, 9, U.S.S.R.

[22] Filed: Apr. 8, 1971

[21] Appl. No.: 132,393

[52] U.S. Cl. ........ 34/151, 34/148, 263/6 R, 425/383, 425/317
[51] Int. Cl. .............................................. F26b 13/00
[58] Field of Search ...................... 34/23, 156, 151, 34/148; 263/6 R

[56] References Cited

UNITED STATES PATENTS

| | | | |
|---|---|---|---|
| 1,951,004 | 3/1934 | Willis | 34/156 |
| 2,848,820 | 8/1958 | Wallin et al. | 34/156 X |
| 3,048,383 | 8/1962 | Champlin | 34/156 X |
| 3,512,267 | 5/1970 | Eichholz et al. | 34/54 X |

FOREIGN PATENTS OR APPLICATIONS 668,741  3/1952  Great Britain .......................... 34/155

Primary Examiner—Carroll B. Dority, Jr.
Attorney—Holman & Stern

[57] ABSTRACT

A machine for making articles from sheet thermoplastic material which is characterized by a group of openings provided in the smooth surface of the machine table and communicating with a source of hot gas fed under pressure to define a gas cushion supporting the blank above the table surface and assisting in the heating of the blank.

2 Claims, 3 Drawing Figures

APPARATUS FOR PRODUCING THERMOPLASTIC SHEET ARTICLES

BACKGROUND OF THE INVENTION

The present invention relates to apparatus for making articles of sheet thermoplastic materials.

The invention can be most effectively used for making bulky articles (up to 1.6 m long) of a complex shape.

PRIOR ART

The known machine for making articles from sheet thermoplastic materials comprise a table capable of reciprocating movement and having a smooth surface to accommodate a blank in the process of heating thereof. From the table of the machine the blank is then fed for molding.

In the known machines, the blank is in close contact with the surface of the table and it is difficult to provide convective heat transfer between the contacting surfaces. This results in nonuniform heating of the blank by thickness in due time and in reduction of the rate of heating, therefore, decreasing the efficiency of the known machines.

Furthermore, it will be noted that during the nonuniform heating of the sheet material to a plastic state and in the process of molding these thermoplastic materials, there are formed sections of concentrated stresses and local thinnings of the material which adversely affect the strength of the prepared articles.

The heating of sheet thermoplastic materials, particularly viscous-flowing materials, is associated with occasional adhesion of the material to the surface of the table which hinders the removal of the blank and the transfer thereof for molding.

To prevent this "adhesion" of the blanks to the smooth surface of the table, the latter is covered with a special material (for example, glass cloth) having antiadhesive properties.

The use of an antiadhesive material is associated with the additional consumption of labor needed for replacement of the worn antiadhesive material after a certain period of operation of the machine.

To facilitate the removal of the blank from the table, the smooth surface of the table is covered by a layer of powder such as talc before placing the blank thereon. This introduces some inconveniences into the operation of the machine.

OBJECTS AND SUMMARY OF THE INVENTION

An object of the present invention is to eliminate the above mentioned disadvantages.

Another object of the invention is to provide a machine for making articles from sheet thermoplastic material having a table construction for placing the blank and transferring it to molding units which is more efficient and convenient in operation than the known machines of this type, while providing for high quality of the produced articles.

These and other objects are attained by providing such a device for making articles of sheet thermoplastic materials in which, according to the invention, the smooth surface of the table has groups of openings connected to a source of hot gas fed under pressure to provide a gas cushion for keeping the blank above the table surface and assisting in heating of the blank.

Due to such a table construction the present machine provides for high quality of the produced articles while ensuring efficient operation and convenient servicing of the machine.

Other objects and advantages of the invention will be apparent from the following detailed description of one embodiment of the invention, reference being made to the accompanying drawings, in which:

DETAILED DESCRIPTION OF THE INVENTION

Figure 2:
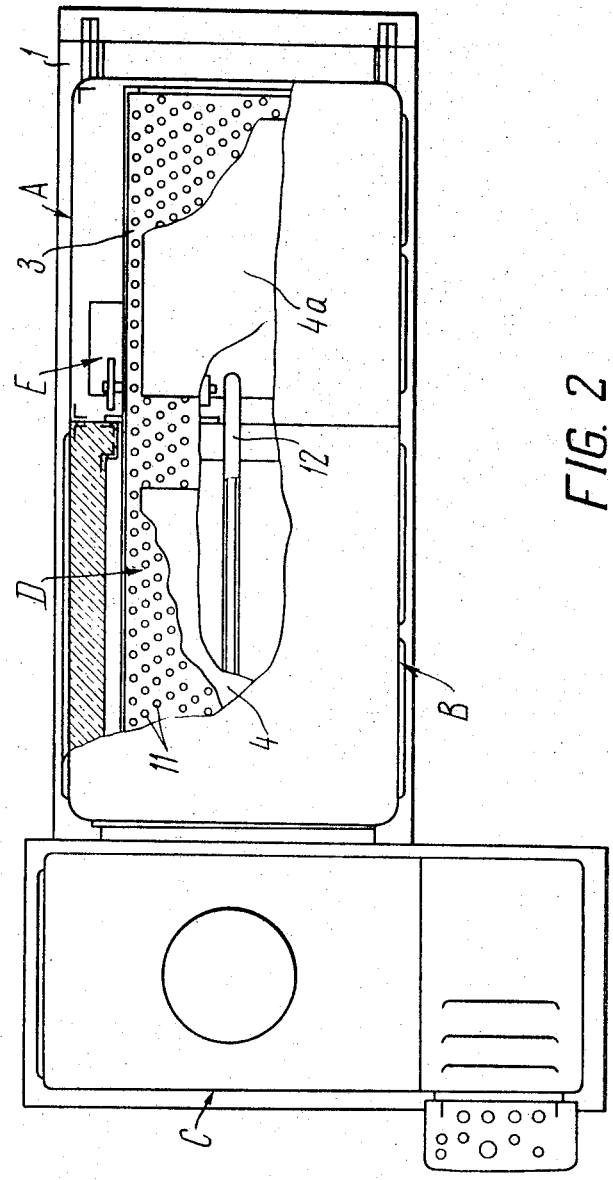
FIG. 2 is a top view of the machine, partly in section.

The machine for making articles from sheet thermoplastic materials comprises a common frame 1 mounting a feeder A, a device B for heating a blank to an elastic state, a device C for forced molding of the heated blank, and a table 3 capable of reciprocating movement guides 2 and having a smooth surface D (FIGS. 2 and 3) for placing thereon a blank 4 in the process of heating the blank and feeding it for molding.

The feeder A consists of a collector of blanks having an arrangement for clamping one blank.

The device B consists of a known chamber-type heating oven.

The device C for forced molding of the blank heated to a plastic state consists of a press having a cross piece 5 provided wth a female die 6 and a stationary plate 7 with a pneumatic chamber 8, an upper hydraulic cylinder piston unit 9, and a lower hydraulic cylinder piston unit 10.

Figure 1:
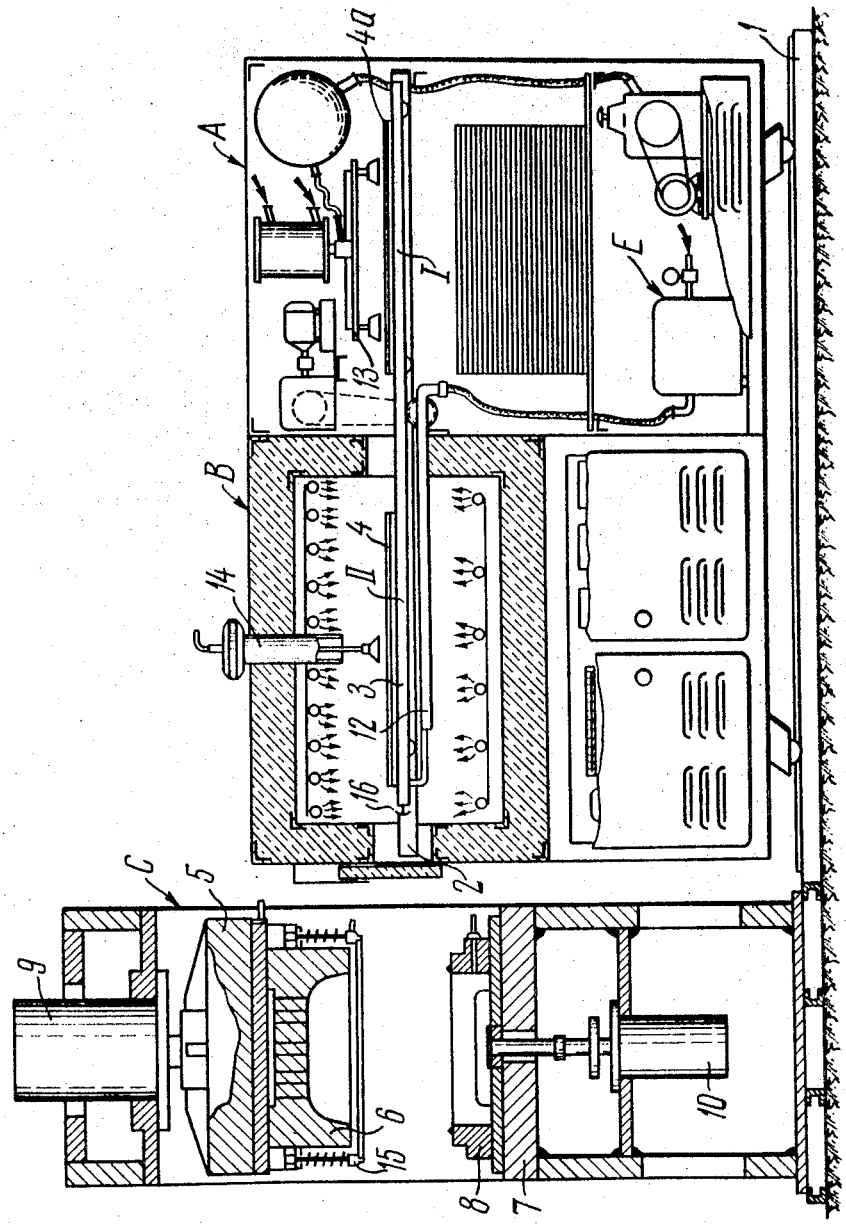
FIG. 1 illustrates the machine according to the invention, the view being partly in elevation and partly in cross-section.

According to the invention, provided in the smooth surface D of the table 3 is a group of openings 11 (FIGS. 2, 3) connected to a source E (FIGS. 1, 2) of hot gas fed under pressure to define a gas cushion holding the blank 4 above the surface D of the table 3 and assisting in heating of this blank.

The gas is fed from the source E through a telescopic pipeline 12. Compressed air having a temperature higher than 100° C may be used as the cushion gas. Nitrogen can also be used to advantage.

Such a construction of the table assists in the intensification and uniform heating of the blank in due time.

The gas cushion assists in a preliminary heating of the blank in the process of placing thereof above the surface of the table before feeding it into the device B, thus reducing the time of heating the blank in such device.

In the device B, the chamber-type heating oven, the flows of thermal energy and the gas cushion defined by compressed air heated to a temperature higher than 100° C), keeping the blank in a "suspended" state, create favorable conditions for heating the blank on two sides.

Thus, the rate of heat transfer through the thickness of the blank material is increased providing for uniform heating of the blank. This, in the long run, eliminates the concentration of stresses and local thinning through the thickness of the material during the molding of the articles, thereby providing for high strength of these articles, which fact is of special importance in the process of production of high-dimension articles having a length of about 1.6 m and a complex shape.

The present machine operates as follows:

Prior to the operation, the table 3 is in an initial position. The table is conventionally divided into portions I and II. The portion I is in the feeder A and the portion II in the device B for heating the blank to a plastic state. The first blank 4 is disposed on the portion I of the table 3.

During the forward movement of the table 3 in the direction toward the device C, a known arrangement 13 for clamping the blank mounted in the feeder A lifts the next blank 4a above the level of the table surface and holds it in this position.

The first blank 4 (FIG. 1) is fed into the heating device B, where it is held above the surface of the table by means of an arrangement 14 located in the heating device. Thereafter, the table is returned to the initial position. In this case, the next blank 4a is placed above the portion I of the table, while the blank 4 located in the device B is placed above the portion II of the table and is supported there by the air cushion.

After completing the process of heating, the first blank 4 fed by the table into the device C (FIG. 3) 3) for forced molding. In this case, the blank heated to a plastic state is removed from the portion II of the table by means of a vacuum frame 15 disposed along the contour of the female die 6 and is held by this frame, until the molding is started.

Now, the next blank 4a disposed above the portion I of the table is fed into the device B and is held there by the arrangement 14, while the following blank fed from the feeder A is clamped by the arrangement 13 and is held thereby in the "above-the-table" position.

Then, the table is returned to the initial position. In this case, the blank 4a disposed in the device B is placed above the portion II of the table 3 and is supported by the air cushion, whereas the following blank held by the arrangement 13 is supported on the air cushion of the portion I of the table.

Thereafter, under the action of the upper hydraulic cylinder 9, the cross piece 5 with the female die 6 and the vacuum frame 15 carrying the blank 4 closes the pneumatic chamber 8 providing for hermetic sealing of the blank along the contour of the article being molded with the material being simultaneously squeezed out.

The force of the lower hydraulic cylinder piston unit 10 effects preliminary drawing of the material, shaping of the fitting seats and forming the holes in the articles being molded.

The molding of the articles is effected by the pressure of a gaseous medium fed into the pneumatic chamber 8.

Figure 3:
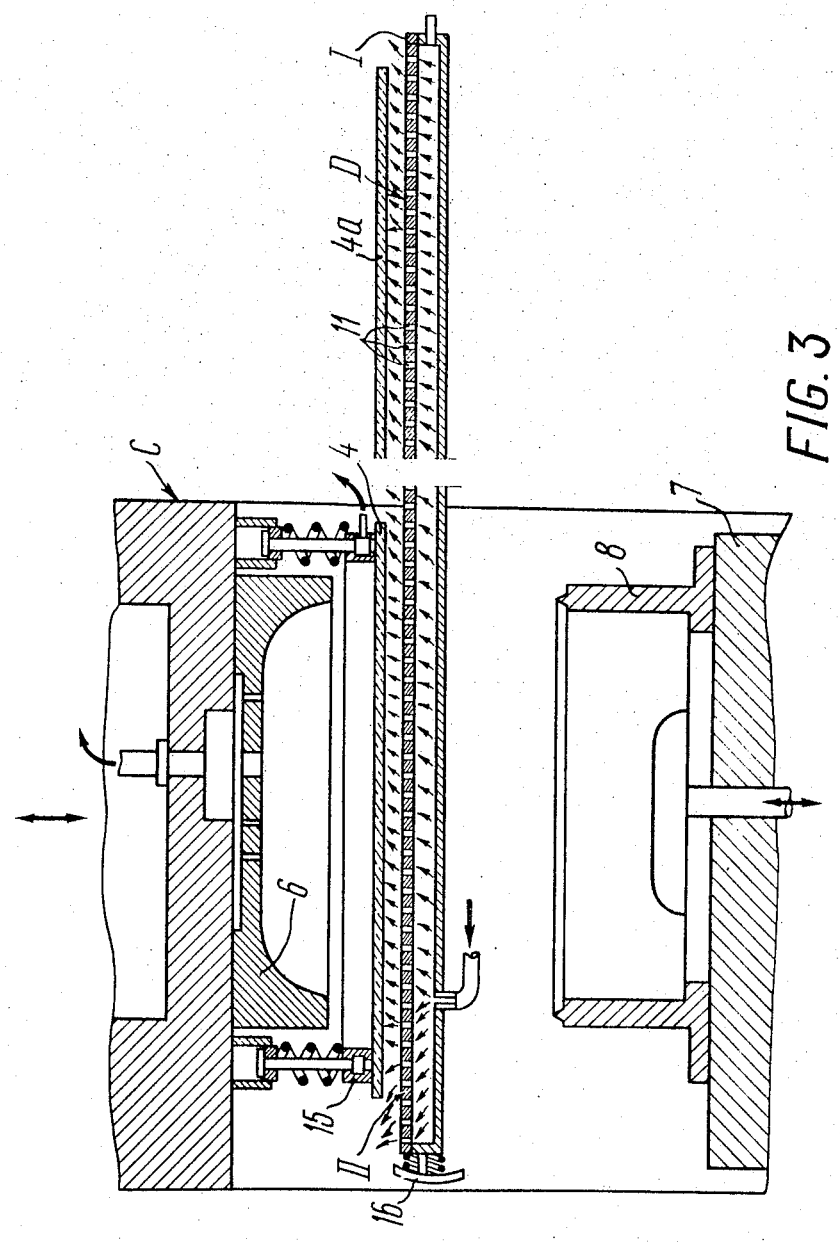
FIG. 3 illustrates the table with a blank in the molding zone, the view being partly in section and on an enlarged scale.

After completing the molding, the prepared article is removed from the zone of the molding device C by means of a pusher 16 (FIG.3).

Then, the table, moving in the direction of the device C, feeds the next blank 4a for molding and feeds the following blank into the device B.

Such a sequence of feeding the blanks is effected during the reciprocation of the table in the process of making the articles.

The air cushion supporting the blank provides for convenient servicing of the machine, particularly when feeding and removing the blank in the process of molding, thus ensuring reliability of these operations and permits the process of making the articles to be automated.

I claim:

1. A machine for making articles from sheet thermoplastic material comprising feeding and heating means, said feeding and heating means being in communication, a table having first and second portions located in the feeding and heating means when the table is in its initial position, means mounting the table for reciprocating movement relative to and between said feeding and heating means and a position adapted to supply a shaping means, said table having a smooth surface for receiving a blank of thermoplastic material on the first portion thereof when the table is in its initial position, said smooth surface being provided with groups of openings throughout said first and second portions, meas for feeding hot gas under pressure to the groups of openings to provide a gas cushion supporting the blanks above the smooth surface which assists in a uniform heating throughout the cross-section of the blank when the blank is in the heating means and facilitates the removal of the heated blank from the table when the table has moved to a position adapted to supply a shaping means.

2. The machine as claimed in claim 1, in which the table is defined by a bottom wall, side walls, and said smooth surface constituting the top wall thereby providing a hollow body.

* * * * *